United States Patent Office 3,446,020
Patented May 27, 1969

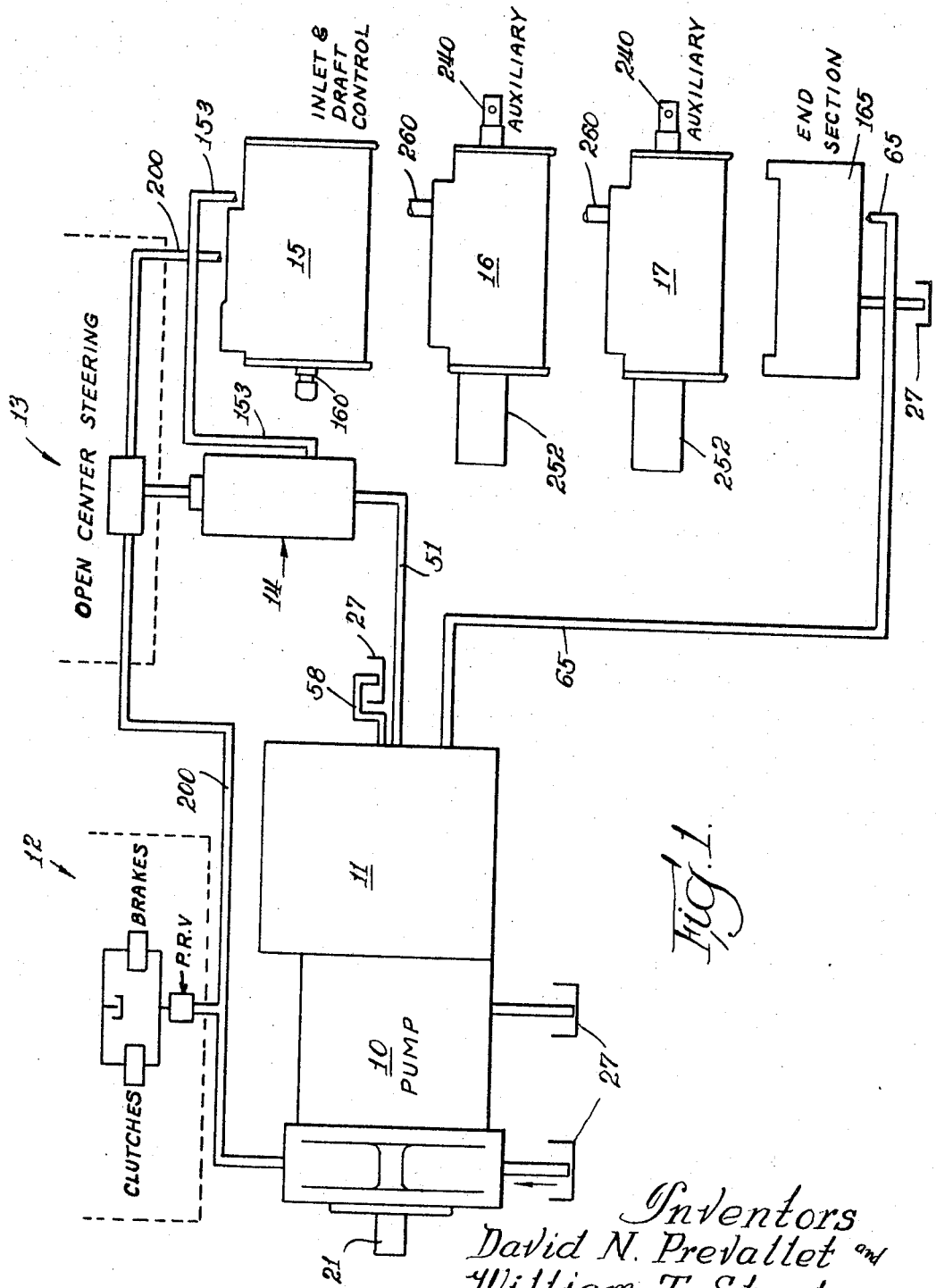

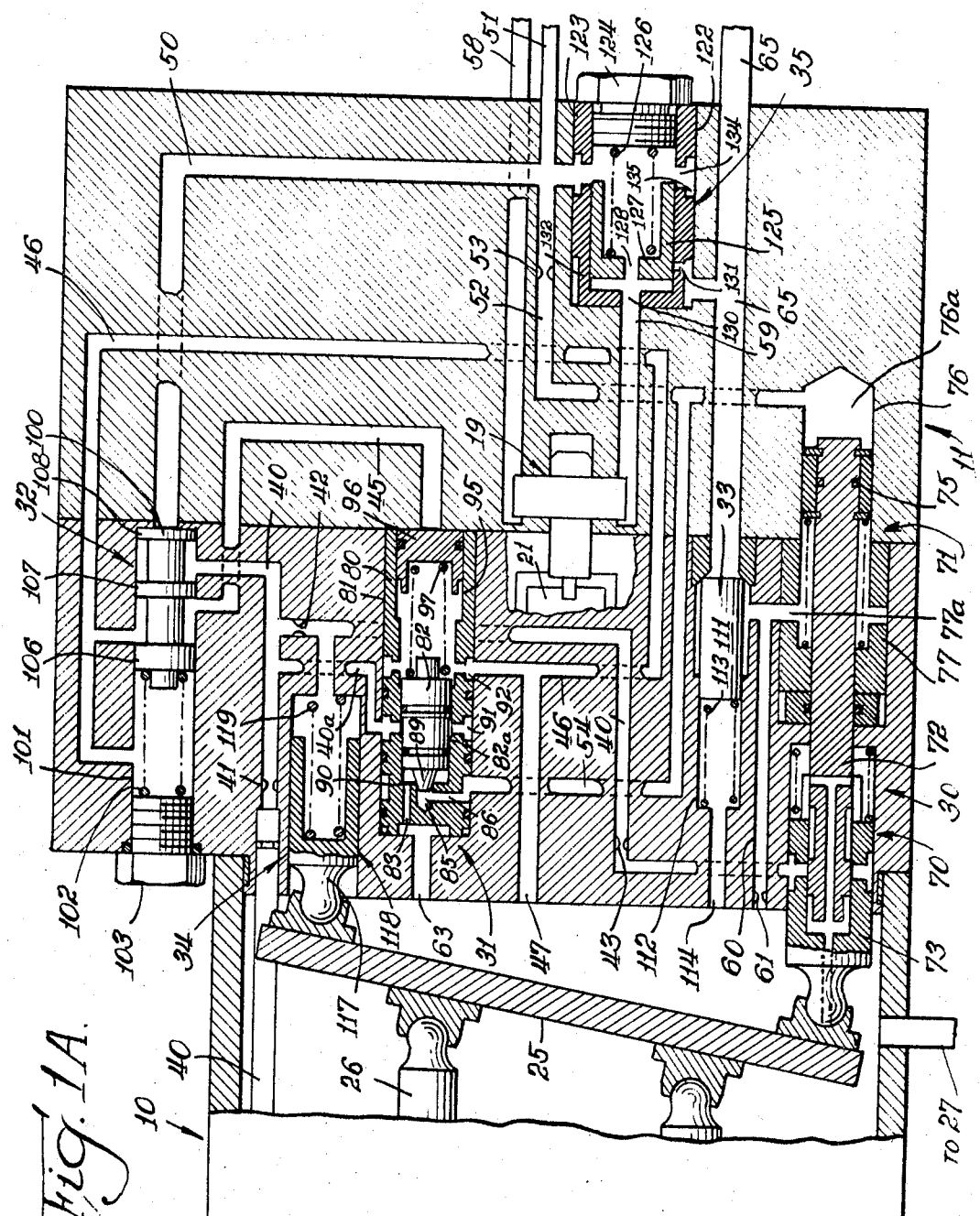

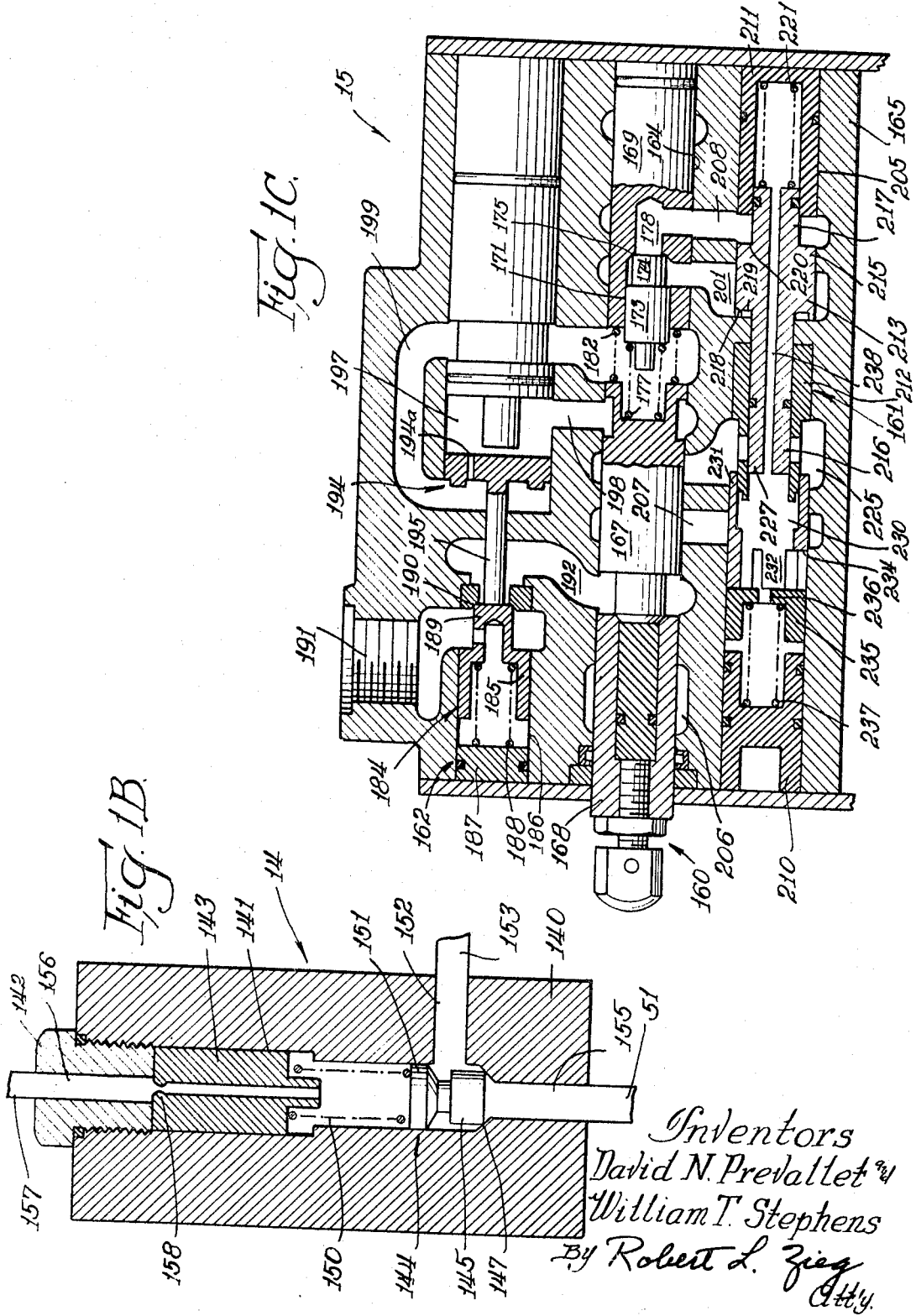

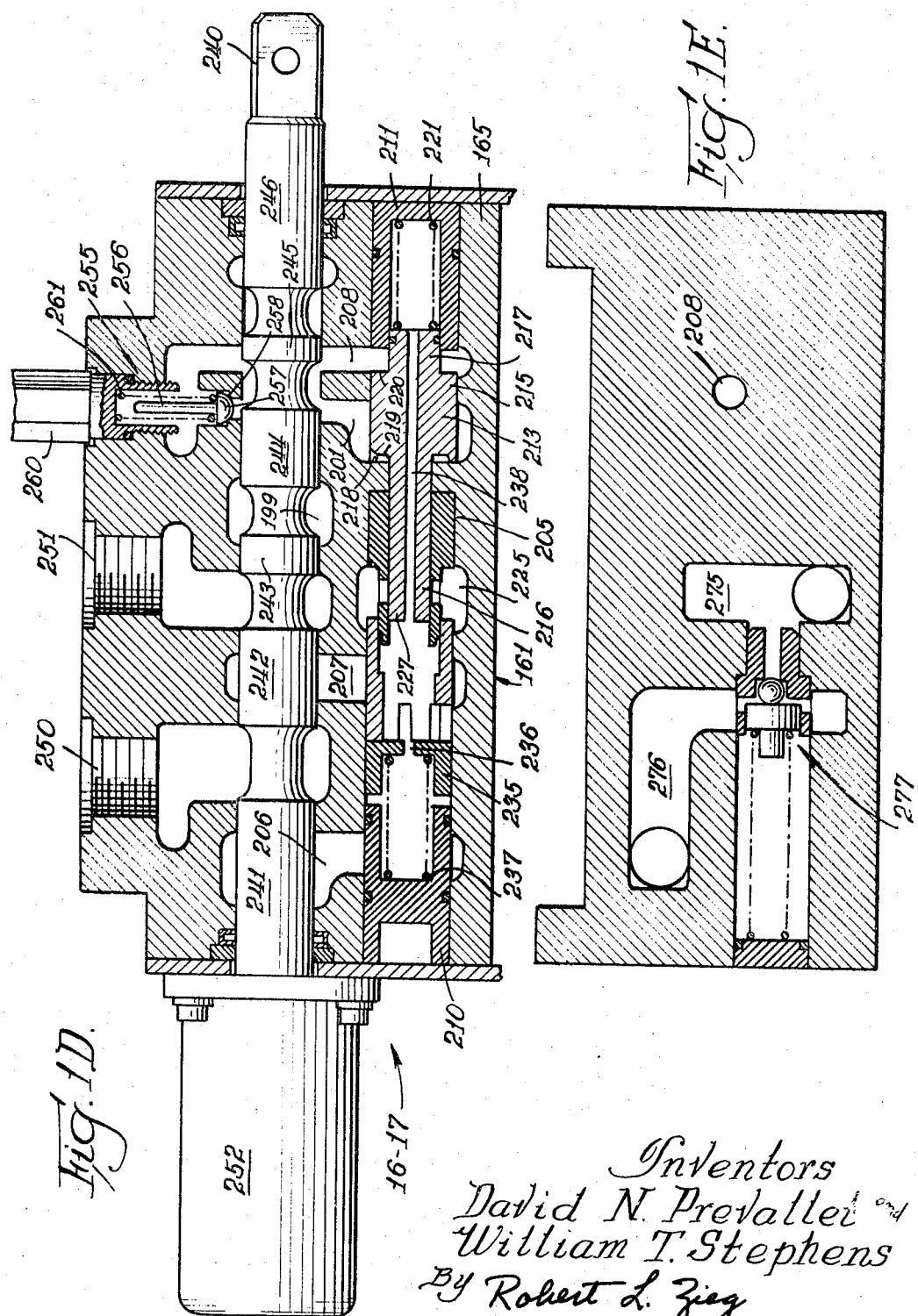

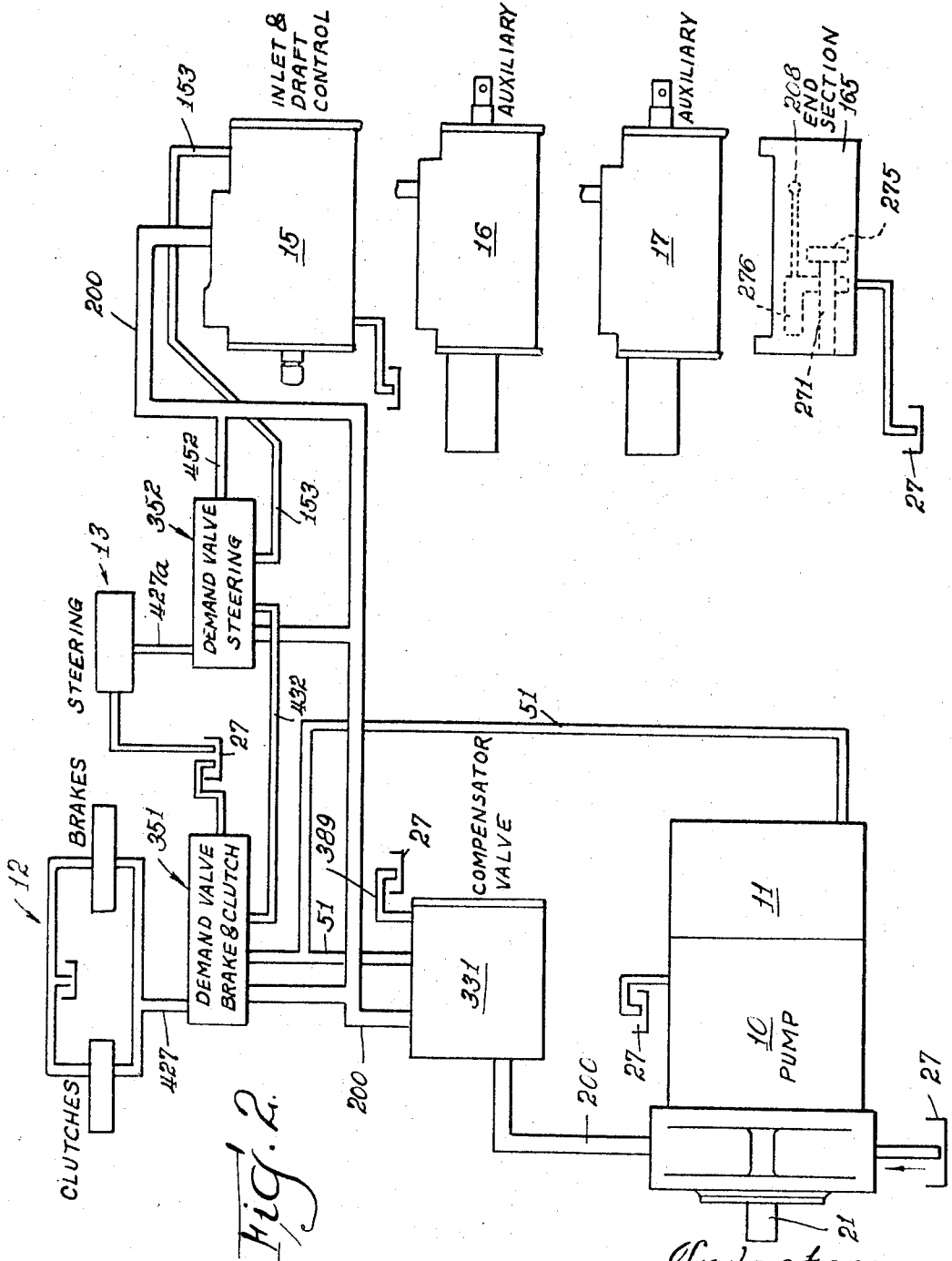

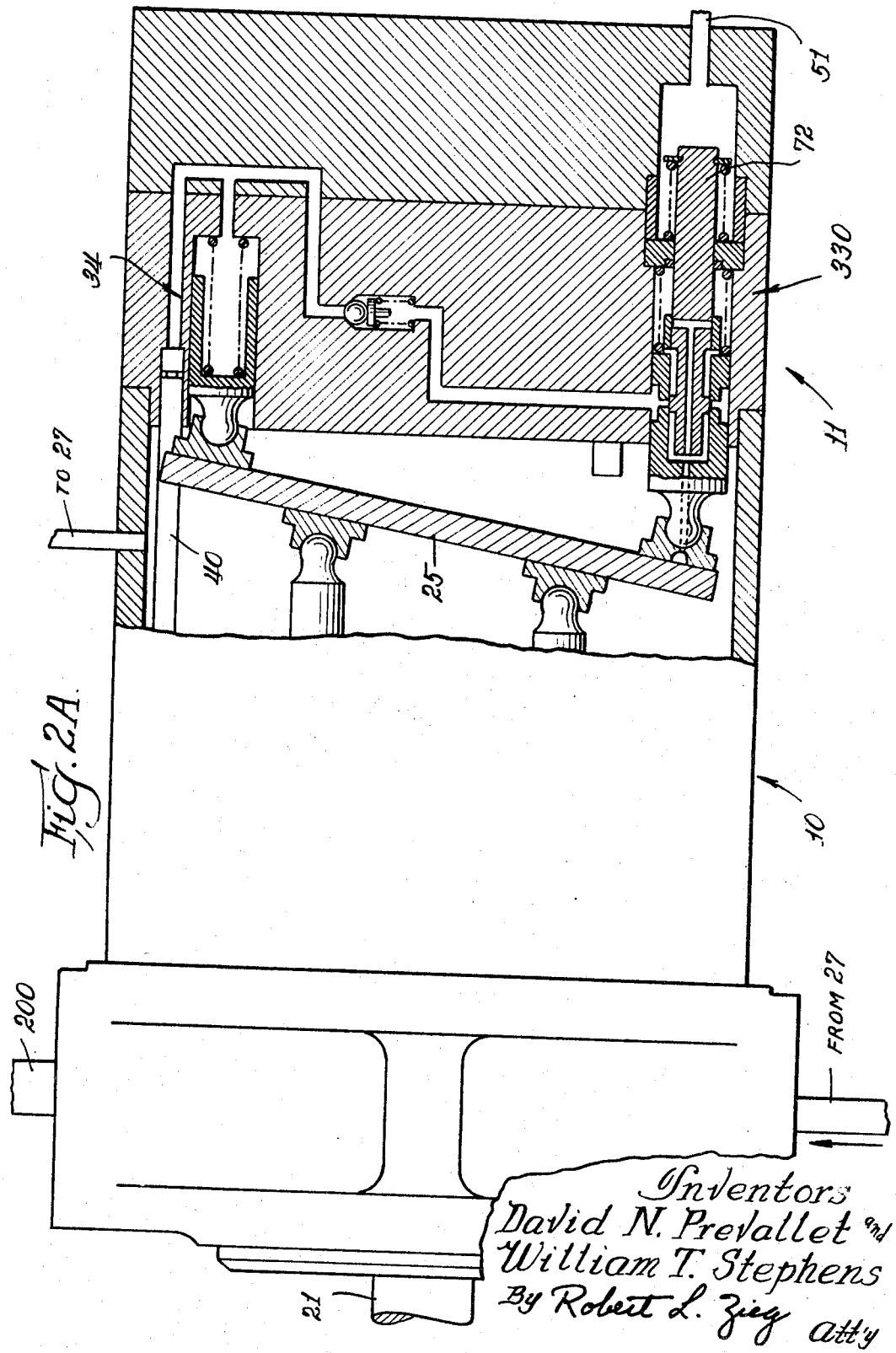

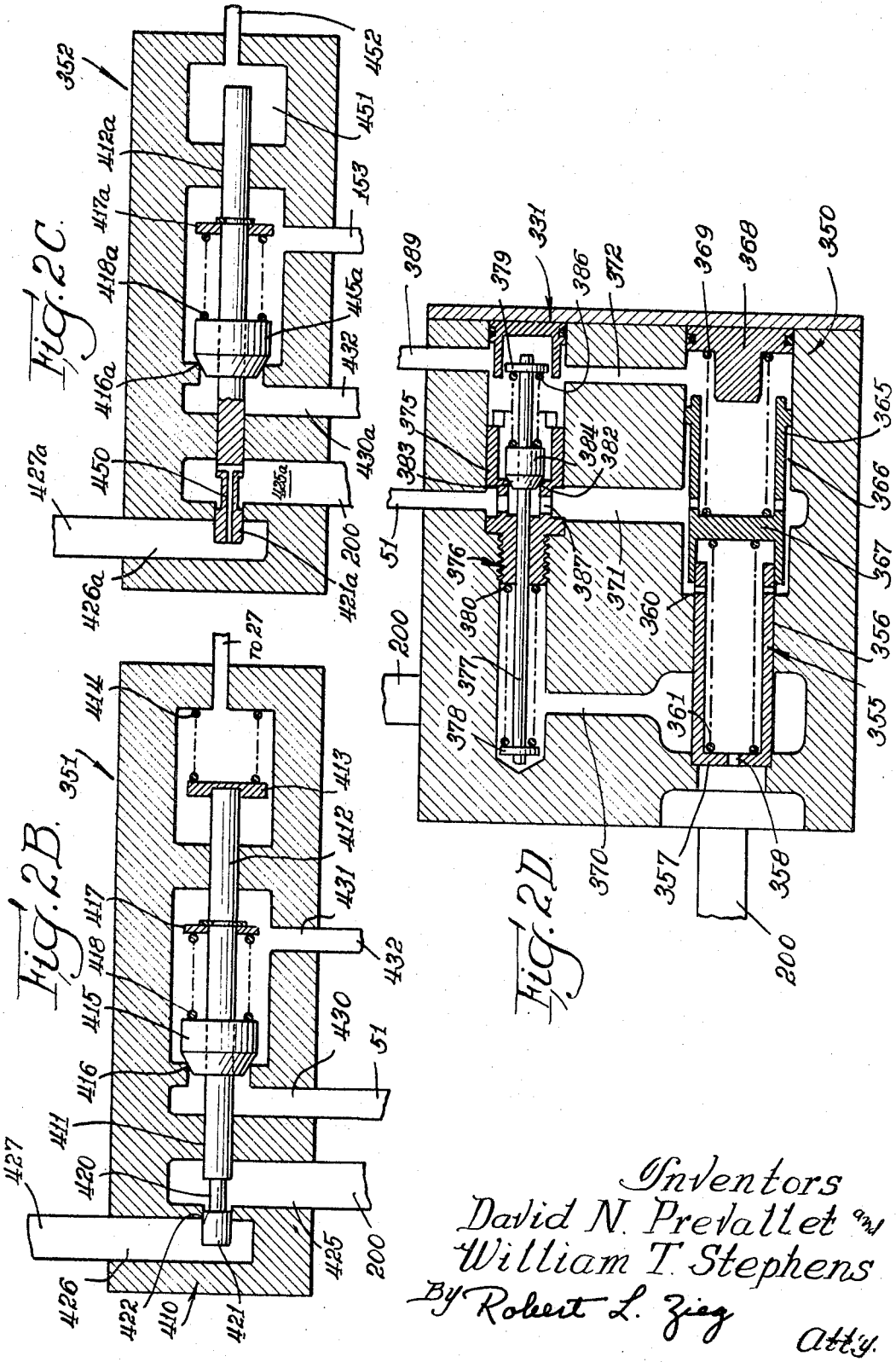

3,446,020
HYDRAULIC TRANSMISSION SYSTEM
William T. Stephens, Edina, Minn., and David N. Prevallet, Crawfordsville, Ind., assignors to Borg-Warner Corporation, Chicago, Ill., a corporation of Illinois
Filed May 29, 1967, Ser. No. 642,052
Int. Cl. F16h *39/46;* F16k *39/48*
U.S. Cl. 60—52                                 12 Claims

ABSTRACT OF THE DISCLOSURE

A system including a variable displacement pump to supply fluid under pressure to a plurality of work performing devices to be used alternatively or simultaneously including a control pressure circuit connected to a valve mechanism for each device, means connected to the control pressure circuit for changing the pump displacement when one of said valves is actuated and means responsive to the speed of the engine driving the pump for reducing the pump displacement in response to increased engine speed.

Summary of the invention

An improved hydraulic transmission system including a variable displacement pump and a plurality of valves operative to supply pressure to work devices comprising means in each said valve to regulate the flow to each said work device and means including a fluid control circuit operative to adjust pump displacement in response to simultaneous or alternative actuation of said valves and means to vary pump displacement in response to the speed of the engine driving the pump whereby pump displacement is adjusted to the proper value to supply the fluid flow required at a particular time.

Description of drawings

FIGURE 1 is a schematic illustration of a control circuit for one embodiment of the invention;

FIGURE 1A is a detailed cross-sectional view of the control system for the pump of FIGURE 1;

FIGURE 1B is a detailed cross-sectional view of the steering valve of FIGURE 1;

FIGURE 1C is a detailed cross-sectional view of the inlet draft control valve of FIGURE 1;

FIGURE 1D is a detailed cross-sectional view of one of the auxiliary valves of FIGURE 1;

FIGURE 1E is a detailed cross-sectional view of the end section of FIGURE 1.

FIGURE 2 is a schematic illustration of a control circuit constituting a second embodiment of the present invention;

FIGURE 2A is a detailed cross-sectional view of the control system for the pump of FIGURE 2;

FIGURE 2B is a detailed cross-sectional view of the brake and clutch demand valve of FIGURE 2;

FIGURE 2C is a detailed cross-sectional view of the steering demand valve of FIGURE 2; and FIGURE 2D is a detailed cross-sectional view of the compensator valve of FIGURE 2.

Referring to the transmission circuit of FIGURE 1, there is illustrated a device including a swash plate type fluid pump 10, a control mechanism 11 for the pump, a clutch and brake mechanism 12, a steering mechanism 13, a steering valve 14, an inlet draft control valve 15, and auxiliary valves 16 and 17. The present fluid transmission system may include additional auxiliary valves depending upon the installation within a tractor or other vehicle and the particular operations to be performed by the vehicle accessories. Also provided is a control pressure pump 19 which is adapted to be driven by the engine of the vehicle and which supplies pressure to the control mechanism 11 for the present device.

A shaft 21 is provided adapted to be driven by the engine of the vehicle and has a connection extending through the pump 10 and to the control pump 19 to operate control pump 19.

The pump 10 of the present device is a pump of the swash plate type having, for example, a swash plate 25 and pistons 26 engageable with the swash plate and adapted to be reciprocated as the cylinder barrel for the pistons is rotated by the engine shaft 21 the displacement of the pump being dependent upon the angle of the swash plate 25 at any particular time. A sump 27 is provided for the pump and for the valves of the present fluid supply system and is schematically represented at several points in the drawing.

The control mechanism 11 for the pump includes a servo control valve 30, a compensator valve 31, a compensator setting valve 32, a constant pressure relief valve 33, a bias piston 34, and a flow control valve 35.

A main pressure conduit 40 connected to the output of pump 10 is provided which is connected to the compensator setting valve 32, the bias piston 34 and the servo valve 30. Included in the main pressure conduit 40 are restrictions 41, 42 and 43. A fluid pressure conduit 45 connects the compensator setting valve 32 with compensator valve 31. A fluid conduit 46 connects compensator setting valve 32 to another location on compensator valve 31. A branch 47 of conduit 46 is open to the sump. A branch conduit 40a also connects main pressure conduit 40 to compensator valve 31. A conduit 50 interconnects the compensator setting valve 32 with the flow control valve 35. Branch conduit 51 interconnects conduit 50 and the steering control valve 14. A branch conduit 52 connects conduit 50 to the servo valve 30. Included in conduit 52 is a fluid restriction 53. A branch conduit 54 connects conduit 52 with compensator valve 31.

A fluid conduit 58 connects the control pressure pump 19 to the sump 27. A fluid conduit 59 connects the output or pressure side of control pressure pump 19 to the flow control valve 35.

A fluid conduit 60 connects the constant pressure relief valve 33 and servo valve 30 to the sump through a restriction 61. A fluid conduit 63 connects compensator valve 31 to sump.

A fluid conduit 65 connects the constant pressure relief valve 33 with the valves 15, 16 and 17.

The servo valve 30 includes a valve section 70 adapted to move the swash plate 25 to a desired angle and an actuating section 71 adapted to actuate section 70. Section 70 comprises a pilot valve 72 slidable in a sleeve 73, the sleeve being adapted to follow longitudinal movement of pilot valve 72 in a manner known in the art as illustrated, for example, in U.S. Patent No. 3,241,317 of common assignee.

Within the actuating section 71 pilot valve 72 has a piston head 75 suitably secured thereto and slidable within a valve bore 76. The piston 75 defines a chamber 76a within valve bore 76. Also supported in the valve bore 76 is the fixed sleeve 77 which is connected to constant pressure relief valve 33 by a port 77a in communication with conduit 60.

The compensator valve 31 includes a fixed sleeve 80 mounted within a bore 81. Slidable within the fixed sleeve 80 is a piston 82. A plurality of ports 83 are provided in the left end of sleeve 80 which connect the interior of sleeve 80 at the left side of piston 82 to the sump by means of conduit 63. Also within the left end of the sleeve 80 is a bore 85 which, by means of a port 86, is connected to conduit 54.

Piston 82 has a conical nose portion 89 thereon adapted to engage with a valve seat 90 provided in the end of bore 85. A port 91 connects the interior of sleeve 80 with fluid conduit 40a. Port 92 connects the interior of sleeve 80 with fluid conduit 46. A stepped portion 95 is provided within the interior of sleeve 80 on the right hand thereof. Slidable within the stepped portion is a piston 96. A spring 97 engages the piston 96 and the piston 82.

The compensator setting valve 32 comprises a valve spool 100 slidable within a bore 101. A spring 102 engages valve spool 100. An end plug 103 is provided to close the bore 101. Valve spool 100 has lands 106, 107 and 108 thereon.

Constant pressure of relief valve 33 includes a piston 111 mounted within a bore 112 and a spring 113 engaging one end of the bore 112 and the piston 111. A fluid conduit 114 connects the bore 112 to the sump.

Bias piston 34 is slidable in a bore 118 and a spring 119 urges piston 34 to the left into engagement with swash plate 25.

Flow control valve 35 comprises a bore 122 having a fixed sleeve 123 mounted therein. The interior of the sleeve 123 is closed by an end plug 124. Mounted within the interior of the sleeve is a piston 125. A spring 126 engages the end plug 124 and piston 125 normally urging the piston to the left as illustrated in FIGURE 1. Piston 125 has an end section or face 127 thereon having an orifice 128 therein which communicates with a port 130 in the end of sleeve 123 and thereby to fluid conduit 59. The end face 127 forms a shoulder on the piston 125 adapted to cooperate with port 131 which communicates with an external groove 132 in sleeve 123. The groove 132 being in fluid communication with fluid conduit 65. The ports 131 cooperate with the shoulder on the piston 125 to perform the flow control function of valve 35. The sleeve 123 also has a port 134 therein communicating with an external groove 135. The groove 135 is in communication with fluid conduit 50.

Steering valve 14 includes a valve body 140 having a stepped bore 141 therein. Fixed within the bore 141 is an end plug 142 and sleeve 143. Also mounted within the bore is a piston 144 having a land portion 145 thereof. A valve seat 147 is provided in the valve body which may be engaged by land portion 145 of piston 144. A spring 150 engages sleeve 143 and piston 144. A bore 151 is provided which connects the area behind the piston 144 with a port 152 in the valve body which is in turn connected with fluid conduit 153. A port 155 connects bore 141 with fluid conduit 51. A bore 156 extends through end plug 142 and sleeve 143 to connect bore 141 with the steering mechanism for a vehicle through fluid conduit 157. A restriction 158 is provided in the bore 156.

Inlet or draft control valve 15 includes a manual selector valve 160 adapted to be moved by the operator, a fluid control section 161, and a load check mechanism 162.

Manual selector valve 160 includes a bore 164 provided in the valve body 165. A piston 167 is slidable in the bore 164 and a slidable section 168 is mounted in bore 164 and adapted to be moved by the operator. A fixed sleeve 169 is mounted in the right end of bore 164. Sleeve 169 has a stepped bore 171 therein containing a relief valve 172 which is open when the manual selector valve 160 is in its neutral position.

The relief valve 172 comprises a piston 173 having a nose portion 174 thereon of smaller diameter than the main portion of the piston. The nose portion 174 is adapted to engage a valve seat 175 provided in the sleeve 169. A spring 177 engages the piston 167 and the piston 173. A bore 178 provided on the right side of piston 173 in the sleeve 169 is adapted to transmit fluid to a passage 208. A spring 182 is also provided engaging piston 167 and fixed sleeve 169.

The load check section 162 includes a load check valve 184 including a piston 185 slidable in a bore 186. The bore 186 is closed by an end plug 187. A spring 188 engages the end plug 187 and piston 185. The piston 185 has a nose portion 189 thereon adapted to engage a valve seat 190 provided in the valve body 165. A pressure port 191 connects the load check valve to a single acting fluid work cylinder (not illustrated) which would provide for the draft control for a blade or other implement to be lifted on a vehicle. The fluid passage 192 connects the load check valve to a manual selector valve 160.

A piston 194 is provided in valve body 165 and has a rod section 195 thereon which may at times engage the piston 185. One side of piston 194 is connected by fluid conduit 198 with the manual valve 160. The other side of the piston is connected by fluid passage 199 to the manual selector valve. Passage 199 is connected to the sump and is a low pressure passage although the connection to the sump is not illustrated in the drawing.

A main pump pressure conduit 200 connects the output of fluid pump 10 to the clutch and brake system for a vehicle with which the control system may be used, to the steering mechanism 13, to the inlet and draft control valve 15, and auxiliary valves 16 and 17. The main pressure conduit 200 is connected to the flow control section of valves 16 and 17 as will be later described. Fluid conduit 153 which is an extension of the fluid conduit 51 after passing through steering valve 14 (which may be identified as the control pressure conduit) is likewise connected to the valves 15, 16 and 17 and is connected to a fluid passage 201 in each of the valves.

The flow control valve section 161 of the inlet draft control 15 is identical with the flow control valve section provided on each of the valves 16 and 17 and therefore only the flow control pressure section 161 for the draft control valve 15 will be described. The manual control valve for each of valves 16 and 17 is different from that described above for the draft control valve 15 and will be separately described.

Flow control section 161 comprises a bore 205 in the valve body 165 which is connected to the manual selector valve by fluid passages 206, 207 and 208 in addition to fluid passage 201. Provided in the left end of the bore 205 is a fixed sleeve 210 and in the right end of the bore is a fixed sleeve 211. Central in the bore is a fixed sleeve 212. A piston 213 is provided which is slidable within the sleeves 212 and 211. The piston 213 has an enlarged diameter portion 215, a reduced portion 216 slidable in sleeve 212 and a reduced portion 217 slidable in the sleeve 211, portions 216 and 217 normally being of equal diameters. The enlarged portion 215 is slotted at 218 which allows fluid pressure in passage 201 to act on shoulder 219 on the enlarged portion. A shoulder 220 is provided on the opposite end of enlarged portion 215 which is subjected to fluid pressure in passage 208. A spring 221 engages sleeve 211 and the piston 213. A port 225 is provided in the sleeve 212 and bore 205 which has main line pressure from conduit 200 connected thereto. The ports 225 in each of the valves are thus connected in parallel to the main fluid pressure conduit 200 so that each of the valves 15, 16 and 17 has main line fluid pressure at this port.

An end face 227 is provided on the reduced portion 216 of piston 213 which cooperates with the ports 225 in the sleeve 212 to provide an orifice of variable size to admit fluid pressure from conduit 200 and port 225 into a hollow area 230 of a movable sleeve 231. Movable sleeve 231 is mounted within the bore 205. Hollow area 230 also receives the end of fixed sleeve 212.

Movable sleeve 231 has a slotted end at 232 which forms a shoulder 234 which cooperates with a fluid passage 207 to admit fluid pressure from the hollow area 230 into fluid passage 207 from which it may be transmitted to the pressure supply ports of the valves. A piston 235 is also provided slidable in bore 205 which has a central passage 236 therein opening into the interior of movable sleeve 231. A spring 237 is mounted between and engaging fixed sleeve 210 and piston 235 so that the spring 237 urges piston 235 to the right, thereby urging slidable sleeve 231 to the right. A central bore 238 is provided in piston 213 which interconnects hollow area 230 of movable sleeve 231 with the interior of fixed sleeve 211 to equalize pressure on the end of portions 216 and 217 of piston 213.

In each of the auxiliary valves 16 or 17 there is provided a manual selector valve 240. Since each of the valves 16 or 17 or any additional auxiliary valves will have an identical manual valve structure only the manual valve for auxiliary valve 16 will be described. The manual selector valve 240 has lands 241, 242, 243, 244, 245 and 246 thereon. Connected to the manual valve selector 240 within the valve body 165 is a pair of ports 250 and 251. These ports are adapted to be connected to a double acting type of hydraulic cylinder which, for example, in one situation would be used to swing the boom on a crane or other device so that at times port 250 would be the pressure supply port to the hydraulic cylinder and port 251 would be the return port or if the manual valve is actuated in the opposite direction, the function of the ports 250 and 251 would be reversed. A suitable detent mechanism 252 is provided for the manual valve to hold it in its selected positions, the detent mechanism is not illustrated since any known type of detent may be used to hold the valve in its selected position.

Passage 201 provided in each of the valves is connected to the control pressure or pilot pressure supply conduit 153 so that the passages 201 of each valve are connected in series to be supplied by control pressure conduit 153. Connected to the fluid passage 201 at the manual valve is a variable relief valve 255 which includes a piston 256 having a rounded head 257 thereon which is adapted to engage a seat 258 provided in the valve body 165. An adjustable handle 260 is provided screw threaded in the valve body 165. A spring 261 is mounted between the piston 256 and the adjusting handle 260 so that the spring force may be varied by manually adjusting handle 260 to change the setting of the relief valve.

An end section of the valve body 165 contains a port 275 to which is connected the main pressure supply conduit 200. Also provided in the end section of valve body 165 is a return port 276 connected to the fluid sump 27. A relief valve 277 which may be of any known type is provided between the port 275 and 276 to act as a safety feature to limit the maximum pressure which may exist in the pressure supply conduit 200.

*Operation*

In general the described system is adapted to be used in a vehicle to supply fluid pressure to the clutch and brake system, steering system, and various auxiliary fluid operated work devices. Swash plate type pump 10 supplies fluid pressure for the operation of the various devices and systems. The servo valve 30 varies the angle of adjustment of the swash plate to ensure adequate fluid supply to the systems regardless of how many of the systems are being used at a particular time.

Fluid conduit 51 is the control or pilot pressure conduit for the valves 14, 15, 16 and 17 of the present device. Pump 19, which is driven by the engine is a control pressure pump supplying fluid pressure to the flow control valve 35. Pressure in conduit 59 acts on end face 127 of piston 125 to move it to the right against the force of spring 126. Flow through the orifice 128 in the end face creates a pressure drop tending to move piston 125 to the right. As the piston moves to the right, the shoulder formed by the end face 127 will partially uncover port 131 so that a certain amount of fluid will be bypassed into conduit 65. Fluid passing through orifice 128 may then pass through ports 134 into the conduits 51 and 50. Since the control pressure pump operates at engine speed, the valve 35 is necessary to maintain a constant flow of pressure in the conduits 50 and 51. The valve 35 is balanced so that flow through the orifice 128 beyond that desired will move the piston 125 to the right to uncover more of the port 131 to reduce the flow. Control pressure in conduit 50 will act on the spool 100 of the compensator setting valve 32 so that when the pressure in conduit 50 exceeds a predetermined value depending upon the size of the spring 102, valve spool 100 will move to the left and establish communication between conduit 40 having main pump pressure therein and fluid conduit 45.

The compensator valve 31 has two settings depending upon the position of compensator setting valve 32, for example, with the compensator setting valve in the position illustrated the compensator valve will maintain a pressure of 300 p.s.i., for example, within the main pressure conduits 40 and 200. After compensator setting valve spool 100 moves to the left and the pump 10 output pressure is connected to the compensator valve 31 through conduit 45 the piston 96 will move to the left to increase the force of spring 97 which is imposed on piston 82.

Compensator valve 31 has an influence on the maximum pressure in fluid conduit 54. Conduit 54 is connected to the servo valve 30 and therefore compensator 31 controls the angle of the swash plate 25 by controlling the pressure in chamber 76a which controls the position of servo valve 30. Within the compensator valve 31, spring 97 will hold piston 82 to the left engaging nose portion 89 with valve seat 90. The main pressure in conduit 40a is admitted through port 91 and acts on the shoulder 82a of piston 82; and if exceeding the desired pressure value, will move the piston 82 to the right against the force of spring 97 and thereby move nose portion 89 away from engagement with valve seat 90 allowing fluid in conduit 54 to flow through ports 83 into exhaust conduit 63 thus as piston 82 varies in its movement the pressure in conduit 54 will be varied and thus the setting of the servo motor will be varied to provide compensation to keep the pump output at a desired level.

The operation of the servo valve 30 is as follows: control pressure in conduits 52 and 54 will be admitted into chamber 76a and act on piston 75 to move the pilot valve 72 and thereby determine the setting of swash plate 25. Control fluid pressure after flowing through the valves 15, 16 and 17 will be admitted through constant pressure relief valve 33 and through port 77a to act on the left end of piston 75 and oppose movement of the piston 75 to the left.

Pressure in conduit 65 is maintained by the setting of relief valve 33 which may, for example, be 50 p.s.i. All the oil from the control pressure pump 19 is forced past relief valve 33, through conduit 60 and restriction 61. The pressure drop across restriction 61 is proportional to flow and hence the fluid pressure in conduit 60 and port 77a opposing movement of piston 75 will vary with engine speed. Therefore, as the speed of the engine increases, thereby tending to increase the delivery of fluid pump 10, the piston 75 will move to decrease the angle of the swash plate and thereby maintain constant pump output by reducing pump displacement to compensate for increased engine speed.

Main pump pressure in conduit 40 is supplied to the bias piston 117 to urge the piston to the left to provide a proper biasing force against which the servo valve can operate.

The setting of the compensator valve 31 prior to the time compensator setting valve spool 100 moves to the left is adequate to maintain sufficient flow to operate the vehicle clutch and brake system 12. However, when any of the other systems are operated, the compensator must work at a higher pressure level and is thus raised from 300 p.s.i. to 2200 p.s.i., for example, by movement of the piston 96 increasing force of spring 97. When any of the valves 14 through 17 is actuated, the pressure in conduits 51 and 50 is sufficiently raised to actuate the compensator setting valve 32. When steering mechanism 13 is utilized, for example, pressure fluid operating the steering is also admitted into conduit 157 which flows through bore 156 in the steering valve 14 and will thus urge the piston 143 against the spring 150 which will urge the piston 144 into engagement with valve seat 147. This will create a pressure drop between conduit 51 and conduit 153 which will actuate the compensator setting valve 32 and servo valve 30. Utilization of any of the other valves 15, 16 or 17 will have the same effect. Restriction 158 is provided in bore 156 through piston 143 to enable fluid in bore 156 to drain when steering mechanism 13 is not being used, as steering mechanism 13 may be of construction such that fluid cannot return through it.

As the pressure drop is increased through the valve 14, pressure in conduit 51 will increase thereby increasing the pressure acting on the right hand end of piston head 75 and can serve to increase the displacement of the pump 10 to insure adequate flow to the steering mechanism. Each of the valves 15, 16 and 17 is additive in this manner and as each one is used, a pressure drop through the particular valve will correspondingly increase the pressure in conduit 51 and correspondingly through the servo valve 30 increase the displacement of the pump 10 to provide adequate fluid flow to supply each of the systems being used.

For example, within the inlet and draft control valve 15, control pressure fluid in conduit 153 is connected to fluid passage 201 and acts on differential area provided on piston 173 to normally open the relief valve 172 and allow flow into fluid passage 208. However, when the manual selector valve 160 is actuated, the force of spring 177 will increase and tend to engage nose portion 174 with valve seat 175 to create a pressure drop across relief valve 172 which will in turn actuate the servo valve in a manner above described. When the manual selector valve 160 is in the neutral position, spring 177 is not loaded, and hence relief valve 172 creates no pressure drop.

When the valves 16 and 17 (or any additional valves of this nature to be used) are in the neutral position illustrated, passages 201 and 208 are inter-connected thereby creating no pressure drop through the valves in conduits 153 and 50. However, when the manual selector valve 240 is moved in either direction, pressure in passage 201 is forced to flow through relief valve 255 and the pressure drop thereby created is dependent upon the setting of relief valves 255. Thus as additional valves are utilized, due to the additive effect of the pressure drops, the pressure increases in conduit 51 and on the right side of piston 75 moving the pump swash plate 25 to provide the increased fluid flow demanded.

When manual selector valve 160 of control valve 15 is moved to the right, for example, the piston 167 will uncover fluid passage 207 which has pump pressure connected thereto and connected passage 207 to fluid passage 192. Fluid pressure in passage 192 acts on load check valve piston 185 to move it to the left and admit pressure to port 191 from which it flows to a single acting hydraulic cylinder (not illustrated) of the type, for example, as used on the lift for an implement system or similar device. When it is desired to lower the load the manual selector valve 160 will be moved to the left. If, however, the manual selector valve is left in its neutral position, as illustrated, cutting off the pressure flow to fluid passage 192, the load check valve 184 will close and hold the load in its position.

If the manual selector valve 160 is moved to the left, fluid pressure existing in port 225 will be admitted to passage 198 and will act on piston 194 to move it to the left whereby rod 195 will open load check valve 184 to allow fluid under pressure from the hydraulic cylinder to exhaust through port 191, fluid passage 192, the groove between piston 167 and section 168, and passage 206 which is connected to return port 276 thereby allowing the load to be lowered. An orifice 194a is provided in piston 194 so that fluid in chamber 197 can be drained and allow piston 194 to return to the right when manual selector valve 160 is returned to the neutral position.

In the valves 16 and 17 two pressure ports 250 and 251 are used since they are adapted to be connected to double acting hydraulic cylinders in which either side of the cylinders may be pressurized. If the manual selector valve 240 of valves 16 or 17 is moved to the left, for example, fluid pressure in passage 207 can flow between lands 242 and 243 and into port 251 to flow to the hydraulic work cylinder. At this time fluid from the other end of the work cylinder may exhaust through port 250 between the lands 241 and 242 into return passage 206. If the manual valve is moved to the right, pressure in passage 207 will flow between lands 241 and 242 and into port 250 to pressurize the other side of the work cylinder to move it in the opposite direction. At this time, port 251 becomes a return port, fluid pressure from the cylinder may flow through and between the lands 242 and 243 to return passage 199.

Flow control section 161 for each of the valves 15, 16 or 17, is identical and therefore only the operation of the flow control section 161 for valve 15 will be described. As described above, when the manual valve is actuated, a pressure drop exists between the control pressure supply passage 201 and passage 208. Shoulders 219 and 220 on the piston 213 are of equal area and therefore this pressure drop will tend to move the piston 213 to the right against the force of spring 221. As previously described, port 225 is connected to the main fluid pressure conduit 200. When the piston 213 moves to the right, the shoulder formed by the end face 227 will cooperate with port 225 to establish an orifice size admitting fluid pressure into area 230 of sleeve 231. The size of the orifice will be controlled by the pressure drop across the relief valve 255 and its effect on piston 213.

Slots 232 formed in the sleeve 231 cooperate with an edge of the fluid passage 207 to establish an orifice size admitting fluid pressure from area 230 into passage 207. This orifice size will depend upon the value of the spring 237 tending to move sleeve 231 to the right and on the fluid pressure existing in port 225 acting on the end face 233. An increase in pressure in port 225 will tend to move sleeve 231 to the left decreasing the orifice size at the edge of passage 207 thereby increasing the pressure drop across the orifice to compensate for increase in pressure beyond that desired in port 225. Thus the pressure which will exist in fluid passage 207 to be supplied to the hydraulic work cylinders is influenced by a pressure drop across relief valve 255 establishing an orifice size at port 225 and also by the value of the main line pressure in port 225 establishing the size of the orifice at passage 207.

Flow control valves 161 are used with each valve 15, 16 or 17 so that when two valves are operated the valve requiring the least pressure will not get the total flow intended for both valves and thereby increase the speed of actuation of the device being supplied with fluid from the valve requiring the least pressure. It is not necessary that the particular flow valves described be used, other known types may be used to perform the described function.

From the above, it will be apparent that the embodiment of the present invention illustrated in FIGURE 1 conveniently provides a control system where a plurality of work-performing devices such as hydraulic cylinders be supplied with fluid pressure are provided on a vehicle in which a variable volume pump is used to supply pressure. The volume or displacement of the pump is established by pressure drops created in the control pressure circuit which is connected to the hydraulic valves for each of the work-performing devices to be operated. If more than one valve is used at a time, the pressure drop created at each control valve as established by relief valves 255 will be additive in nature and the total pressure drop established in the control pressure circuit will act on the servo valve to establish a pump displacement sufficient to provide an adequate fluid flow to each control valve being utilized.

Further, since the control pressure pump is driven at engine speed, an output pressure signal therefrom is applied to the servo valve for the pump acting in a direction opposite to that of the pressure drop in the control pressure circuit so that as engine speed increases (which would normally increase the total fluid flow from the pump) the servo valve will be moved to reduce pump displacement to compensate for increased engine speed and thereby allow better control of speed of working units, for example, in a power steering unit where it is desirable to maintain a constant oil flow or a rotary device as a mower which may be driven hydraulically through valve 16, it is desirable to maintain a constant speed. This system also functions to reduce the pressure level to a minimum setting when there is no demand for higher pressure.

Referring to the control system in the embodiment of FIGURE 2, there is disclosed a system including a hydraulic pump identical with that of FIGURE 1 which includes a bias piston 34 identical with that of FIGURE 1 and a servo valve 330 similar in construction to valve 30 of FIGURE 1. The system of FIGURE 2 eliminates the control pressure pump.

The control pressure supply conduit 51 is supplied with control pressure by means of a priority flow control valve 350 which supplies a portion of the main pump flow in conduit 200 to the control pressure conduit 51. The system also includes a compensator valve 331, brake and clutch demand valve 351 and a steering demand valve 352. Conduit 153, similar to conduit 153 of FIGURE 1, and conduit 200 are adapted to be connected to the draft control and auxiliary control valves of identical construction to those shown in FIGURE 1 and the valves are therefore not illustrated in FIGURE 2.

Servo valve 330 works in a similar manner to servo valve 30 of FIGURE 1. Control fluid pressure in conduit 51 being operative to act on the pilot valve 72 to increase pump displacement.

Priority flow control valve 350 includes a piston 355 slidable in a bore 356. Piston 355 has an end section 357 thereon. An orifice 358 connects conduit 200 to the interior of piston 355. Ports 360 are provided in the piston 355. A spring 361 urges piston 355 to the left as illustrated in the drawing.

Priority flow control valve 350 also includes a piston 365 slidable in a bore 366, the piston being divided into two hollow sections by an intermediate wall 367. Bore 366 is closed by an end plug 368. A spring 369 engages end plug 368 and the wall 367 to urge piston 365 to the left. Spring 361 of piston 355 also engages wall 367. Fluid passages 370, 371 and 372 connect valve 350 with valve 331.

The purpose of the valve 350 is to insure a flow of fluid to the control pressure conduit 51 to insure that the controls have control pressure upon operation of the pump 10 so that the controls will respond when actuated by the operator. When pump 10 begins pumping, the piston 365 is held to the left as illustrated in the drawing by spring 369. Pressure thus flows through orifices 358, ports 360, around the outside of piston 365 into passage 371 and through compensator valve 331 into control pressure conduit 51. When the pressure in the interior of piston 355 builds up to a predetermined value, this pressure plus the effect of the pressure drop through the ports 360 will move piston 365 to the right. This movement will release the force of spring 361 and allow main pump pressure to move piston 355 to the right and admit main pump pressure into fluid passage 370 which is connected to main pressure conduit 200. Thus, the priority flow control valve will admit fluid pressure into the main conduit 200 only after desired flow is established in the control pressure conduit 51.

Compensator valve 331 includes a fixed sleeve 375 mounted within a stepped bore 376. Slidable within the sleeve 375 is a piston rod 377 having a head portion 378 upon the left end thereof and a head portion 379 on the right end thereof. A spring 380 extends between sleeve 375 and head portion 378. The sleeve includes a counterbore 382 forming a valve seat 383. A piston 384 is provided slidable on rod 377 and is engageable with valve seat 383. Spring 386 engages head portion 379 and piston 384. Ports 387 connect the interior of counterbore 382 with fluid passages 371 and conduit 51. A fluid conduit 389 connects the right end of bore 376 to the sump 27.

The purpose of compensator valve 331 is to control the pressure within main pressure conduit 200 by influencing the pressure in control pressure conduit 51. Spring 386 normally holds piston 384 in engagement with valve seat 383. However, if the pressure in conduit 200 and thus in passage 370 exceeds a predetermined value, this pressure will act on the left end of rod 377 to move the rod to the right, thereby relaxing spring 386 and allowing the piston 384 to move away from the seat to reduce the pressure in conduit 51 thus allowing the servo valve 330 to reduce the pump displacement.

Demand valve 351 for the brakes and clutch system 12 comprises a valve body 410 having a bore 411 therein in which is slidable a rod 412. Mounted on the rod 412 at the right end thereof is a head portion 413. A spring 414 extends between the valve body 410 and head portion 413 urging the rod 412 to the left. Slidable on the rod 412 is a piston 415 engageable with a valve seat 416 provided in body 410. A plate 417 is secured on the rod 412. A spring 418 extends between piston 415 and plate 417. The rod 412 has a groove 420 thereon. On the left end of the rod is formed a head portion 421 including a series of metering notches 422. A port 425 connects groove 420 to main pressure conduit 200. A port 426 connects to the left end of rod 412 and to a conduit 427 which supplies pressure to the clutch and brake system 12. A port 430 connects control pressure conduit 51 to the left side of piston 415 and to a control pressure conduit 432 which is connected to the steering demand valve 352.

When the pressure demand by the clutch and brake system 12 is satisfied, the rod 412 will be in a position such that spring 418 is relaxed and control pressure in conduit 51 can move piston 415 off of valve seat 416 and communicate control pressure through port 431 and conduit 432 to steering demand valve 352 without a significant pressure drop between conduits 51 and 432.

A demand for oil in the clutch and brake system 12 is felt as a reduced pressure on the left end of rod 412. If system pressure in conduit 200 is higher than the pressure required in the clutch and brake system 12, the rod 412 together with spring 414 and metering notches 422 will act as an ordinary pressure reducing valve to supply the clutch and brake system. During this type of operation, the spring 418 is relaxed as previously explained. If on the other hand, pressure in conduit 200 is equal to or lower than the pressure desired in the clutch and brake system 12, the rod 412 will move further to the left, placing spring 418 under load which will cause piston 415 to create a pressure drop across seat 416. This pressure drop will actuate servo valve 330 to establish a pump displacement proper to supply desired flow to the clutch and brake system 12.

When the desired pressure exists in the clutch and brake system 12, the pressure will act on the left end of rod 412 to move the rod back to the right and reduce the pressure drop again between conduits 51 and 432 to an insignificant amount. The piston 415 will in operation establish the pressure drop required to provide flow to maintain pressure in the clutch and brake system as needed.

The steering demand valve 352 is somewhat similar in construction to the demand valve 351 and similar parts are identified by like numerals with the addition of suffix a. Head portion 421a, however, has no metering notches. Instead there is provided a small passage 450 extending through the center of the rod and in communication with ports 426a and 425a. On the right end of rod 412a a chamber 451 is provided which is connected to main pressure conduit 200 by a conduit 452. When there is demand for fluid pressure to operate the steering mechanism 13 and fluid flow begins through the small passage 450, a pressure drop is created. The pressure acting on the left end of rod 412a being less than the main conduit pressure acting on the right end thereof so that the rod 412a will move to the left to urge piston 415a to a position to create a pressure drop between conduit 432 and conduit 153 in a like manner to the operation of piston 415 of demand valve 351. This pressure drop will likewise act on servo valve 330 to increase the pump displacement to provide a flow adequate to supply the steering system. When the steering system is supplied, flow will cease, and the pressure in port 426a will equal pressure in chamber 451 from main conduit 200 so that rod 412a will return to a position to relax spring 418a and establish a condition in which there is no significant pressure drop between conduit 432 and conduit 153.

From the above it will be apparent that the embodiment of FIGURE 2 provides an improved control system in which the brake and clutch system or the steering system or any of the auxiliary systems can create a pressure drop in conduit 51 to actuate the servo valve 330 to establish required pump displacement as in the case of the system of FIGURE 1. These pressure drops are additive so that as additional systems are actuated the pump displacement is correspondingly increased so that adequate fluid flow is established to supply the systems being utilized. The control system of FIGURE 2 includes a priority flow control valve which insures adequate pressure in the control circuit before pressure is supplied to the main pressure conduit 200 leading to the devices to be operated so that the operator is assured of a pump response to the controls actuated at any time. In the system of FIGURE 1 control pressure always is present whenever the vehicle engine is running but in the simplified circuit of FIGURE 2 eliminating the control pressure pump, priority flow control valve 350 becomes necessary to insure fluid flow to the control system.

It is to be understood that the present invention is not to be limited to specific constructions and arrangements shown and described, except only insofar as the claims may be so limited, as it will be understood to those skilled in the art that changes may be made without departing from the principles of the invention.

What is claimed is:

1. A fluid supply system for supplying fluid pressure to a plurality of work-performing devices including a variable displacement fluid pump, a servo mechanism including a servo control valve adapted to control displacement of the pump, a plurality of fluid valve means adapted to supply pressure to said work-performing devices, a control pressure circuit connected to each of said valve means, said control pressure circuit also connected to said servo control valve, means in said valve means adapted to establish a pressure drop through said valve in said control pressure circuit, whereby when said valve means are actuated the pressure drop created will actuate said servo control valve to adjust the displacement of the pump to provide the required flow to the work-performing device controlled by the particular fluid valve means actuated wherein said valve means includes a manually adjustable relief valve connected to said control pressure circuit whereby said relief valve may be adjusted to variably establish a pressure drop in said control pressure circuit when said valve means is actuated.

2. A fluid supply system for supplying fluid pressure to a plurality of work-performing devices including a variable displacement fluid pump, a servo mechanism including a servo control valve adapted to control displacement of the pump, a plurality of fluid valve means adapted to supply pressure to said work-performing devices, a control pressure circuit connected to each of said valve means, said control pressure circuit also connected to said servo control valve, means in said valve means adapted to establish a pressure drop through said valve in said control pressure circuit, whereby when said valve means are actuated the pressure drop created will actuate said servo control valve to adjust the displacement of the pump to provide the required flow to the work-performing device controlled by the particular fluid valve means actuated and including a flow control valve connected to said pump and to said control pressure circuit, said flow control valve being operable to supply fluid pressure to said control pressure circuit prior to supplying fluid pressure to said valve means to actuate the work-performing devices.

3. A system as claimed in claim 2 wherein said flow control valve includes a piston movable in response to fluid flow therethrough, said piston being operatively connected to a piston controlling admission of fluid pressure to a main pressure supply conduit for the work-performing devices whereby only when said first piston moves in response to increased fluid flow will said second piston be actuated to admit fluid pressure to said main fluid pressure conduit.

4. A system as claimed in claim 1 wherein each of said valve means includes a flow control valve movable in response to said pressure drop established in said control pressure circuit through said valve means to adjust the fluid flow of main fluid pressure through said valve means to the work-performing device.

5. A fluid supply system for supplying fluid pressure to a plurality of work-performing devices including a variable displacement fluid pump, a servo valve actuatable to vary the displacement of said pump, a plurality of control valves each connected to a work-performing device and to said fluid pump, a control pressure pump, a control pressure circuit connected to said control pressure pump and to each of said control valves, a pressure relief valve in each of said control valves connected to said control pressure circuit, said control pressure circuit also being connected to said servo valve, whereby when one of said control valves is actuated to supply fluid pressure to one of said work devices, the relief valve in said control valve will create a pressure drop in said control pressure circuit to actuate said servo control valve to adjust the displacement of said fluid pump to provide the required fluid flow to the work device.

6. A system as claimed in claim 5 wherein said relief valves are manually adjustable whereby the pressure drop created by said relief valves may be adjusted 7. A system as claimed in claim 6 wherein each of said control valves includes a flow control valve movable in response to said pressure drop established in said control pressure circuit to adjust the fluid flow of fluid pressure from said fluid pressure pump to said work-performing devices.

8. A system as claimed in claim 5 wherein a constant displacement fluid pump is provided to supply fluid pressure to said control pressure circuit.

9. A system as claimed in claim 8 wherein said constant displacement fluid pump is connected to be driven by an engine driving said variable displacement pump, said constant displacement fluid pump being connected to said servo valve whereby said servo valve will be actuated to reduce the displacement of said variable displacement pump in response to increasing engine speed.

10. A fluid supply system for supplying fluid pressure to a plurality of work performing devices including a variable displacement fluid pump, a servo mechanism adapted to control displacement of the pump, a supply circuit including means adapted to supply fluid under pressure to said work performing devices, a control pressure circuit connected to said servo mechanism and said means, valve means in said control pressure circuit connected to the variable displacement fluid pump and to said supply circuit and adapted to admit fluid pressure from said fluid pump into said control pressure circuit, said valve means further including fluid responsive means moving in response to the flow of fluid in said control pressure circuit to admit fluid under pressure from said fluid pump to said supply circuit whereby said valve means will insure adequate flow of fluid in said control pressure circuit prior to the supply of fluid under pressure to said supply circuit.

11. A system as claimed in claim 10 wherein said fluid responsive means comprises a piston having fluid under pressure from said pump flowing therethrough to said control circuit.

12. A system as claimed in claim 11 wherein said fluid responsive means further includes a second piston yieldably urging said first piston to a position blocking fluid from said fluid supply circuit, the flow of fluid through said control circuit and through said first piston creating a force on said second piston so as to lessen the urging force of said second piston on said first piston whereby flow through said control circuit will move said first piston from its blocking position.

References Cited
UNITED STATES PATENTS

| | | |
|---|---|---|
| 2,892,311 | 6/1959 | Van Gerpen. |
| 2,892,312 | 6/1959 | Allen et al. |
| 3,366,064 | 1/1968 | Stephens et al. |

EDGAR W. GEOGHEGAN, *Primary Examiner.*

U.S. Cl. X.R.

60—19.97